United States Patent [19]

Vogl et al.

[11] Patent Number: 4,523,008
[45] Date of Patent: Jun. 11, 1985

[54] STABILIZED UNSATURATED POLYESTERS

[75] Inventors: Otto Vogl, New Rochelle, N.Y.; Eberhard Borsig, Bratislava, Czechoslovakia

[73] Assignee: The United States of America as represented by the Administrator of the National Aeronautics and Space Administration, Washington, D.C.

[21] Appl. No.: 617,871

[22] Filed: Jun. 6, 1984

[51] Int. Cl.³ .................. C08G 63/20; C08G 63/44
[52] U.S. Cl. ...................... 528/288; 525/26; 525/47; 526/328; 526/329.2; 528/289; 528/303; 528/304
[58] Field of Search ............ 525/26, 47; 526/328, 526/329.2; 528/303, 304, 288, 289

[56] References Cited
U.S. PATENT DOCUMENTS 3,814,724  6/1974  Suzuki et al. .............. 525/47 X
3,962,055  6/1976  Pacifici et al. ............. 525/26 X
3,962,056  6/1976  Pacifici et al. ............. 525/26 X Primary Examiner—Lucille M. Phynes
Attorney, Agent, or Firm—Paul F. McCaul; John R. Manning; Thomas H. Jones

[57] ABSTRACT

An unsaturated polyester, such as propylene glycol-maleic acid-phthalic acid prepolymer dissolved in styrene is interpolymerized with an ultraviolet absorber of the formula:

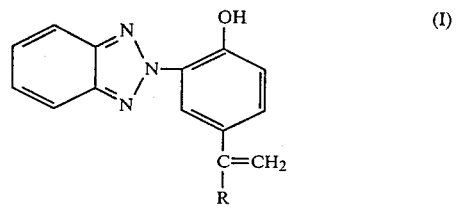

and/or an antioxidant of the formula

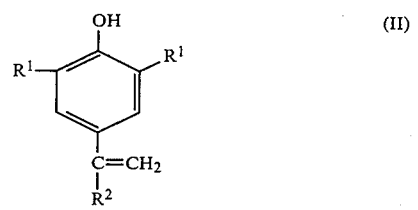

where R and $R^2$ are selected from H or lower alkyl such as methyl and $R^1$ is tertiary alkyl such as tertiary butyl to form a polymer stable to exposure to the outdoors without degradation by ultraviolet radiation, thermal and/or photooxidation.

10 Claims, 3 Drawing Figures 4,523,008

STABILIZED UNSATURATED POLYESTERS

DESCRIPTION

1. Technical Field

This invention relates to stabilized polyesters, and more particularly, to so-called unsaturated polyesters containing interpolymerized ultraviolet absorbers and antioxidants.

Unsaturated polyester resins are sometimes utilized in applications where they are exposed to the environment such as exterior coatings for building surfaces or as encapsulants for panels of photovoltaic cells. One of the problems, especially in outdoor use, is the limited stability towards oxidation and particularly photooxidation when used outdoors. The next generation of flat plate solar arrays require at least twenty years of service. These so-called unsaturated polyester resins will undergo thermal and photodegradation unless modified with antioxidant and/or ultraviolet absorbing stabilizers. Low molecular weight soluble stabilizers are leached by rain or long exposure to the environment and when these fugitive agents migrate to the surface of the film, they can be leached and/or vaporized.

The ultraviolet stabilizers are also chromophores. If too much stabilizer is present in the film, too much visible light is absorbed, reducing the efficiency of the underlying photovoltaic cells. A large amount of compounded stabilizer can also affect the mechanical properties of the polyester.

2-Hydroxy benzophenones are a widely utilized class of U.V. screening agents. Vinyl derivatives of benzophenones have been copolymerized with polymerizable monomers including styrene, methyl methacrylate and butylacrylate and have also been claimed to have been copolymerized with ethylene or propylene. Unsaturated polyester styrene copolymers and to some extent styrene polymers by themselves are intrinsically unstable to ultraviolet radiation and so much of the U.V. absorbing stabilizer would have to be added that the mechanical properties of the copolymer are adversely affected.

Benzotriazole compounds are efficient ultraviolet absorbers. Boyle, et al. (U.S. Pat. No. 3,272,891), Cyba (U.S. Pat. No. 3,600,355) and Kirchmayer, et al. (U.S. Pat. No. 3,642,813) disclose the use of benzotriazoles to stabilize unsaturated polyesters. Kirchmayer, et al. also discloses the attachment of an alkenyl group to a hydroxyphenyl ring by means of amide or ester linkages.

STATEMENT OF THE INVENTION

Unsaturated polyester resins provided in accordance with the invention are capable of long term exposure to the outdoor elements of sun, wind and rain for extended periods without degradation due to ultraviolet radiation and/or photooxidation. The resins contain a polymerizable ultraviolet absorbing stabilizer having a high extinction coefficient and an effective broad spectrum in the ultraviolet range. An antioxidant may also be incorporated into the stabilized polyester of the invention. Both stabilizers are nonvolatile, nonmigratory, and non-leachable. The polyester of the invention contains an ultraviolet stabilizer and/or antioxidant permanently bound to the polymeer chain which enhances the long term chemical and physical stability of the polymer since the stabilizer can not be leached or evaporated from the film or resin. The resin, therefore, retains its physical properties for an extended term, since the chemical resistance provided by the stabilizers is retained for an extended period and low molecular weight material is not leached out causing shrinkage and mechanical deterioration of sample materials.

The polyesters of the invention are prepared by dissolving a vinyl or isoprenyl substituted U.V. absorber and optionally a vinyl or isoprenyl substituted antioxidant in a solution of the polyester in styrene and interpolymerizing the polyester, styrene, U.V. absorber and/or antioxidant to form a stabilized polyester resin. Clear homogeneous, crosslinked polymers are prepared in accordance with the invention having long term thermal and photooxidative stability in the sun.

Copolymers exhibit strong absorption throughout the ultraviolet light range (290–400 nm) present in sunlight at ground level when cast into thin, hard, weatherable, transparent films or sheets. The terpolymer is extremely photostable showing on exposure to the environment no indication of photooxidation, chain scission or photocrosslinking. The copolymer of the invention can be applied as a film to protect substrates that are photodegraded by ground level solar radiation such as photovoltaic cells, solar reflectors, polyethylene or polypropylene pipes, elastomers and the like. The films can be deposited on the surface of the substrates by extrusion, solvent casting or lamination.

These and many other features and attendant advantages of the invention will become apparent as the invention becomes better understood by reference to the following detailed description when considered in conjunction with the accompanying drawings.

DESCRIPTION OF THE INVENTION

Figure 1:
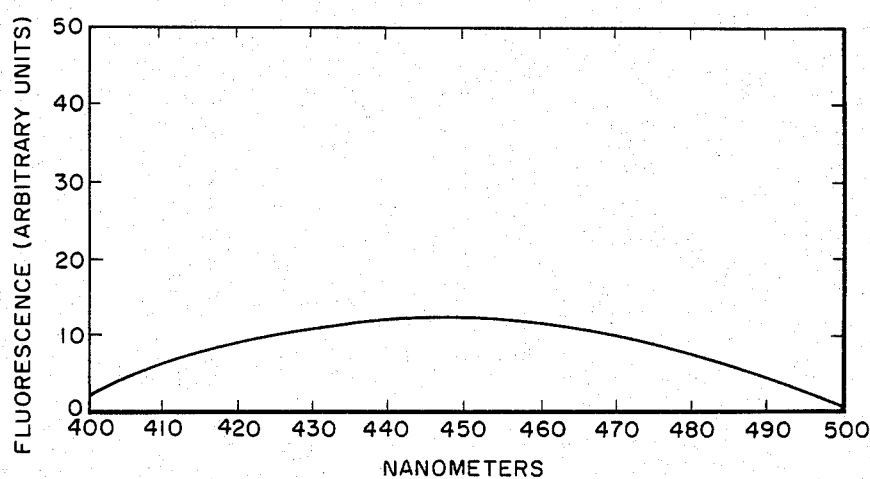
FIG. 1 is a fluorescent spectrum of a stabilized polyester prepared according to this invention.

Unsaturated polyesters utilized in the invention are network resins produced by dissolving an unsaturated, usually linear, unsaturated polyester oligomer or low molecular weight polymer in a vinyl group containing monomer such as styrene, methyl styrene or diallyl phthalate. Cure is accomplished by crosslinking of the vinyl groups between fumarate or maleate groups of polyester chains using a free radical catalyst such as a peroxide or azo compound and possibly a promoter or accelerator. The cure can also be effected by heat or heat can be used to accelerate the cure reaction.

The unsaturated polyester resin is the reaction product of a diol such as ethylene glycol 2,3-propylene glycol, butylene glycol, neopentyl glycol or other polyols and an unsaturated dibasic acid or anhydride such as maleic acid or fumaric acid or maleic anhydride or their substitution product in 2- or 3 position. Saturated dibasic acids such as phthalic acid or adipic acid may be used to produce rigidity or to increase flexibility of the polyester resin.

Unsaturated polyesters are commonly made from oligomeric polyesters prepared from glycols, for example, ethylene, propylene or butylene glycol, and maleic anhydride. The oligomeric polymer esters have maleate and fumarate linkages in the polymer chain; their content depends much on the type of glycol and the reaction conditions under which the polymerization is carried out. These copolyesters are then dissolved in styrene, alpha-methyl styrene, methyl methacrylate or acrylonitrile or other resonance stabilized monomers, normally capable of copolymerization with radical initiators, and copolymerized to prepare the crosslinked polyester. Additives are sometimes used to optimize the properties. Though styrene is exemplified in the following discussion, all the other possible monomers encompassed in this invention may be substituted therefor.

The unsaturated polyester is present in the styrene solvent typically in amounts from 30 to 100 parts of styrene per 100 parts of resin by weight. The polymerizable U.V. absorber and antioxidant may be present in the solution up to their solubility limits, usually no more than 20 percent by weight. The U.V. stabilizer is usually present in an amount from 0.1 to 10 percent by weight, preferably from 1 to 5 percent by weight and the antioxidant from 0.05 to 5 percent by weight, preferably from 0.1 to 3 percent by weight.

The polymerizable stabilizers must be interpolymerizable with styrene and soluble in styrene or the polymerizable mixture of the polyester prepolymers and styrene. Both the U.V. and antioxidant stabilizers of the invention are characterized by both having an ethylenic or isopropylidenic group directly attached to a phenol group. The polymerizable U.V. absorbers of the invention are derivatives of 2(2-hydroxyphenyl)2H-benzotriazoles which have superior ultraviolet absorbing efficiency. These absorbers have good compatibility with the unsaturated polyester system since the vinyl or isopropylidene group is attached directly to the phenyl and, thereof, the compounds are styrene derivatives. The absorber compounds can be selected from compounds of the formula:

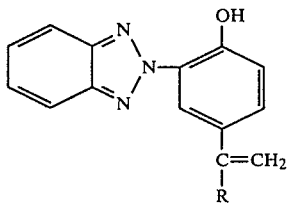

(I)

where R is H or alkyl of 1 to 6 carbon atoms. When R is H, the compound is a styrene derivative 2H5V and when R is CH$_3$, the compound is an alpha-methyl styrene derivative (2H5P). 2H5V readily homopolymerizes and a stabilizer must be added during storage of the pure compound.

The polymerizable antioxidants utilized in the invention are also styrene derivatives. The antioxidants are alkylated phenols of the formula:

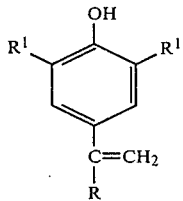

(II)

where R is as defined above and R$^1$ is a tertiary alkyl group containing from 3 to 12 carbon atoms, preferably tertiary butyl. When R$^1$ is tertiary butyl and R is H, the compound is identified as VP and when R$^1$ is tertiary butyl and R is CH$_3$, the compound is identified as PP.

Reaction of the unsaturated polyester, styrene and the polymerizable stabilizes results in a polymer containing interpolymerized groups as follows:

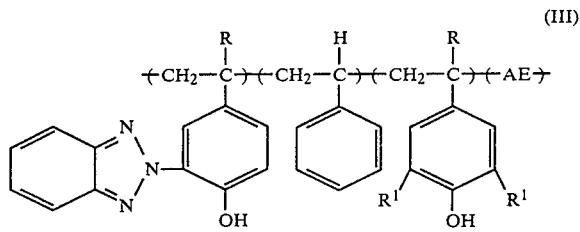

(III)

where AE represents alkyl ester.

Polymerization experiments were conducted to determine the stabilizing efficiency of the polymerizable U.V. stabilizers and antioxidants.

Maleic anhydride (Aldrich Chemical Co.), phthalic anhydride (Aldrich Chemical Co.) and propanediol-1,3 (Sigma Chemical Co.) were used without special purification.

The polymerizable antioxidants of the 2,6-ditertiarybutyl phenol class were also prepared following somewhat improved procedures from the literature: 4-vinyl-2,6-ditertiarybutyl phenol (VP) and 4-isopropenyl-2,6-ditertiarybutyl phenol (PP). The preparation of the unsaturated polyesters are described below.

Styrene (Aldrich Chemical Co.) was washed twice with 5 percent aqueous sodium hydroxide solutions and twice with water to remove the polymerization inhibitor; after drying over anhydrous sodium sulfate, styrene was distilled in a nitrogen atmosphere.

Azobisisobutyronitrile (Aldrich Chemical Co.) (AIBN) was recrystallized three times from anhydrous methanol and dried for one day at 0.01 mm at room temperature.

EXAMPLE 1

The unsaturated polyester was prepared as follows: Maleic anhydride (24.5 g, 0.25 mol), phthalic anhydride (37 g, 0.25 mol) was dissolved in propanediol-1,3 (40 g, 0.5 mol plus 5 percent excess) and heated to 190° C. for 6 hours under nitrogen. The polymer was dissolved in styrene (50 g, 0.48 mol) and a small amount of hydroquinone (18.5 g, 0.17 mmol) was added as inhibitor.

An assembly is prepared which consisted of two clean Pyrex glass plates approximately 2.5 mm thick separated by an elastomeric spacer which provided a space between the glass plates of about 1 mm and giving an area of about 50 mm × 100 mm. The glass plates were clamped at the point of the elastomeric spacer with Binder Clip clamps. AIBN as the initiator and the polymerizable ultraviolet stabilizer (2H5V or 2H5P) or antioxidant (VP or PP) were added to the homogeneous styrene solution of the unsaturated polyester previously prepared (Tables 1-5). The solution was placed in a desiccator which was evacuated at 20 mm for 20 minutes at room temperature to remove dissolved air. Approximately 5–6 g of the solution was filled into a hypodermic syringe and then fed to the assembly from the top.

The assembly was placed in an oven of 60° C. and left there for three days. After the polymerization is complete, the assembly was heated for 20 minutes to 130° C.

to complete the decomposition of residual AIBN. After cooling to room temperature, the clamps were removed; the glass plates separated; the spacer removed and the colorless crosslinked polyester films (1 mm thickness) trimmed to the appropriate size. For measurements, only film samples from the center were used.

TABLE 1

Unsaturated Polyester Resins with Polymerizable Ultraviolet Stabilizer: 2(2-Hydroxy-5-vinylphenyl)2H—benzotriazole (2H5V)

| Unsaturated Polyester | 2H5V | | Analysis of Stabilizer Content | |
|---|---|---|---|---|
| g | mg | wt % | % N | mol % of 2H5V |
| 5.00 | — | — | — | — |
| 5.63 | 56 | 1 | 0.32 | 1.6 |
| 5.52 | 108 | 2 | 0.44 | 2.2 |
| 5.45 | 160 | 3 | 0.50 | 2.6 |
| 5.32 | 275 | 5 | 1.05 | 5.3 |

Initiator: AIBN, 70 mg, 1.3 wt. %
Reaction Temperature: 60° C.
Reaction Time: 3 days
A solution of 66% by weight of unsaturated polyester (Example 1) and 34% by weight of styrene was used.

TABLE 2

Unsaturated Polyester Resins with Polymerizable Ultraviolet Stabilizers: 2(2-Hydroxy-5-isopropenyl)2H—benzotriazole (2H5P)

| Unsaturated Polyester | 2H5P | | Analysis of Stabilizer Content | |
|---|---|---|---|---|
| g | mg | wt % | % N | mol % of 2H5P |
| 5.00 | — | — | — | — |
| 5.50 | 55 | 1 | 0.29 | 1.6 |
| 5.61 | 112 | 2 | 0.38 | 2.1 |
| 5.63 | 168 | 3 | 0.61 | 3.3 |
| 5.70 | 285 | 5 | 0.93 | 5.0 |

Initiator: AIBN, 70 mg, 1.3 wt. %
Reaction Temperature: 60° C.
Reaction Time: 3 days
A solution of 66% by weight of unsaturated polyester (Example 1) and 34% by weight of styrene was used.

TABLE 3

Unsaturated Polyester Resins with Polymerizable Antioxidant: 4-Vinyl-2,6-ditertiarybutyl phenol (VP) or 4-Isopropenyl-2,6-ditertiarybutyl phenol (PP)

| Unsaturated Polyesters | Polymerizable Antioxidant | | |
|---|---|---|---|
| | | Amount | |
| g | Type | mg | wt % |
| 5.00 | — | — | — |
| 5.51 | VP | 11 | 0.2 |
| 5.53 | VP | 24 | 0.5 |
| 5.71 | PP | 10 | 0.2 |
| 5.54 | PP | 27 | 0.5 |

Initiator: AIBN: 70 mg, 1.3 wt %
Reaction Temperature: 60° C.
Reaction Time: 3 days
A solution of 66% by weight of unsaturated polyester (Example 1) and 34% by weight of styrene was used.

TABLE 4

Unsaturated Polyester Resins with Polymerizable Ultraviolet Stabilizer and Polymerizable Antioxidant: 2(2-Hydroxy-5-vinylphenyl)2H—benzotriazole (2H5V) and 4-Vinyl-2,6-ditertiarybutyl phenol (VP)

| Unsaturated Polyester | 2H5V | | VP | | Analysis of 2H5V Content | |
|---|---|---|---|---|---|---|
| g | mg | wt % | mg | wt % | % N | mol % 2H5V |
| 11.00 | — | — | — | — | — | — |
| 5.52 | 55 | 1 | 11 | 0.2 | 0.26 | 1.3 |
| 5.44 | 110 | 2 | 11 | 0.2 | 0.44 | 2.2 |
| 5.44 | 165 | 3 | 11 | 0.2 | 0.60 | 3.0 |
| 5.21 | 251 | 5 | 10 | 0.2 | 0.99 | 5.0 |
| 5.54 | 55 | 1 | 27 | 0.5 | | |
| 5.43 | 110 | 2 | 27 | 0.5 | | |
| 5.36 | 165 | 3 | 27 | 0.5 | | |
| 5.27 | 275 | 5 | 27 | 0.5 | | |

Initiator: AIBN: 70 mg, 1.3 wt. %
Reaction Temperature: 60° C.
Reaction Time: 3 days
A solution of 66% by weight of unsaturated polyester (Example 1) and 34% by weight of styrene was used.

TABLE 5

Unsaturated Polyester Resins with Polymerizable Ultraviolet Stabilizer and Polymerizable Antioxidants: 2(2-Hydroxy-5-isopropenyl)2H—benzotriazole (2H5P) and 4-Isopropenyl-2,6-ditertiarybutyl phenol (PP)

| Unsaturated Polyester | 2H5P | | PP Amount | |
|---|---|---|---|---|
| g | mg | wt % | mg | wt % |
| 11.00 | — | — | — | — |
| 5.41 | 55 | 1 | 11 | 0.2 |
| 5.42 | 110 | 2 | 11 | 0.2 |
| 5.34 | 165 | 3 | 11 | 0.2 |
| 5.22 | 275 | 5 | 11 | 0.2 |
| 5.43 | 55 | 1 | 27 | 0.5 |
| 5.38 | 110 | 2 | 27 | 0.5 |
| 5.31 | 165 | 3 | 27 | 0.5 |
| 5.24 | 275 | 5 | 27 | 0.5 |

Initiator: AIBN: 70 mg, 1.3 wt. %
Reaction Temperature: 60° C.
Reaction Time: 3 days
A solution of 66% by weight of unsaturated polyester (Example 1) and 34% by weight of styrene was used.

A crosslinked, stabilized, unsaturated polyester was prepared according to the procedure of Example 1 containing 1 percent of 2H5V (Polyester I). Fluorescence spectra of Polyester I is shown in FIG. 1. Films of Polyester I and a control polyester which does not contain any 2H5V were subjected to aging studies. The films were mounted in specially fabricated, small sample holders and were placed inside a control environmental test chamber. An irradiation level of 6 suns, AM-1 (300–380 nm) and 1 sun AM-1 (overall) was used to irradiate the samples 22 hours every day. This irradiation period was followed by a 2 hour dark period during which the samples were exposed to a fine water spray.

These aging studies indicate very significantly improved U.V. resistivity of Polyester I as compared to unstabilized polyester.

Figure 2:
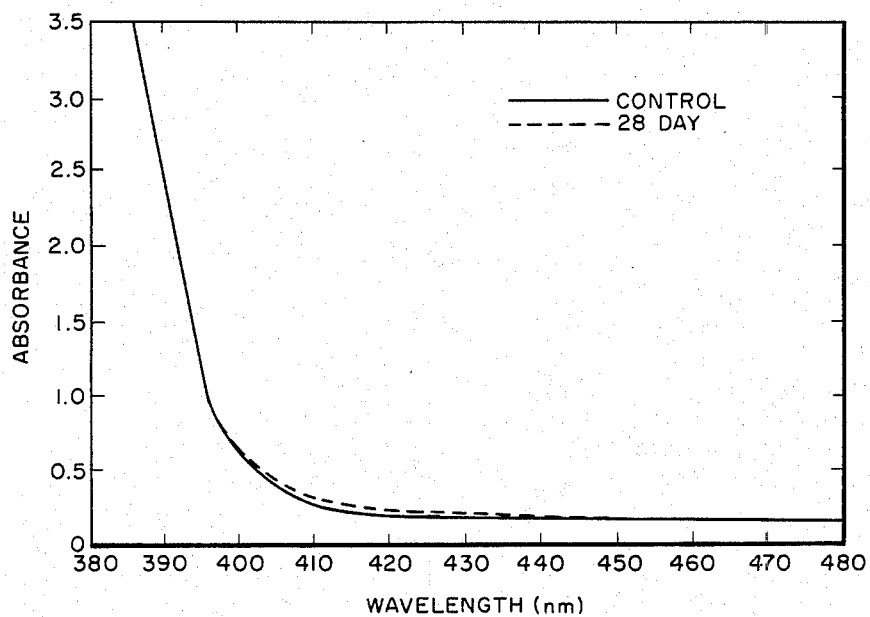
FIG. 2 is an absorption spectrum of the polyester of FIG. 1 as a function of aging.
Figure 3:
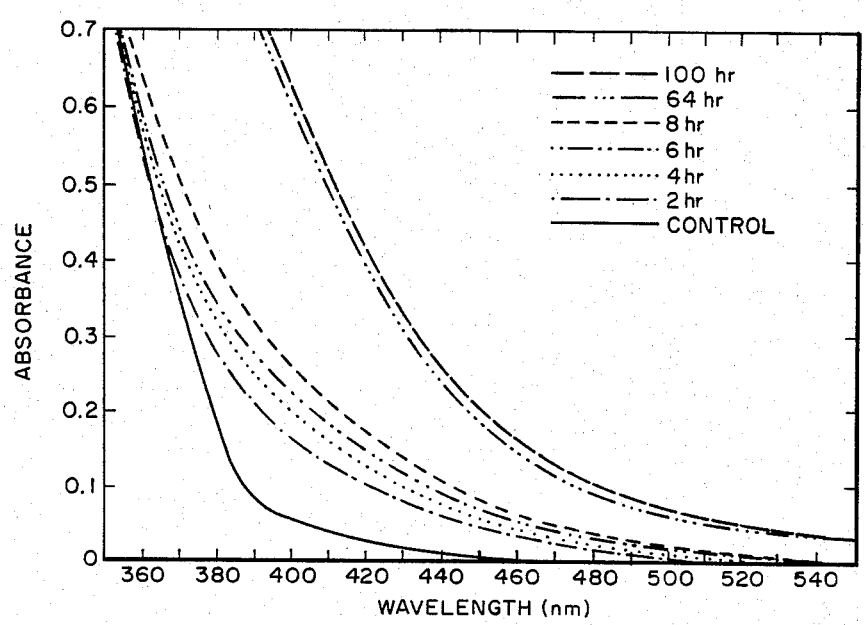
FIG. 3 is an absorption spectrum of an unstabilized polyester as a function of aging.

FIGS. 2 and 3 illustrate the absorption spectra of Polyester I and unstabilized polyester, respectively, as a function of aging. Up to 28 days of aging, very little change can be detected in UVVIS absorption spectrum of Polyester I, whereas, the unstabilized polyester showed a large increase in long wavelength absorption (yellowing) in less than 100 hours of aging.

These studies also showed permanency of the U.V. absorber. Since extinction coefficient of the U.V. absorber is 20,000 lt mole$^{-1}$cm$^{-1}$ in the 300–400 nm wavelength region, any loss of U.V. absorber will result in an appreciable decrease in absorbance in this wavelength region. The invariance of absorbance of Polyester I (FIG. 2) between 380–400 nm after 28 days of aging leads to the conclusion that physical loss of U.V. absorber is not a problem.

It is to be realized that only preferred embodiments of the invention have been described and that numerous substitutions, modifications and alterations are permissible without departing from the spirit and scope of the invention as defined in the following claims.

We claim:

1. An unsaturated polyester polymer comprising an unsaturated polyester prepolymer interpolymerized with at least one stabilizer selected from the group consisting of:

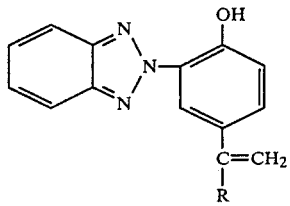     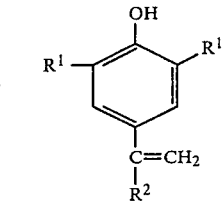

(I)     (II)

where R and $R^2$ are selected from H or alkyl of 1 to 6 carbon atoms and $R^1$ is a tertiary alkyl group containing 3 to 12 carbon atoms.

2. A polyester according to claim 1 in which the unsaturated polyester prepolymer is a copolymer of a diol and an unsaturated dibasic acid or anhydride.

3. A polyester according to claim 2 in which the prepolymer further contains a saturated or aromatic dibasic acid.

4. A polyester according to claim 3 in which the polyester is copolymerized with a vinyl monomer in which it is soluble.

5. A polyester according to claim 4 in which the monomer is styrene.

6. A polyester according to claim 5 in which the diol is selected from the group consisting of ethylene glycol, propylene glycol, butylene glycol or neopentyl glycol, the unsaturated dibasic acid is selected from the group consisting of maleic or fumaric and the saturated acid is selected from phthalic acid or adipic acid.

7. A polyester according to claim 6 in which the diol is propylene glycol, the unsaturated acid is maleic acid and the saturated acid is phthalic acid.

8. A polyester according to claim 1 in which the stabilizer (I) is present in an amount from 0.1 to 10 percent by weight and the stabilizer (II) is present in an amount from 0.05 to 5 percent by weight.

9. A polyester according to claim 4 in which R and $R^2$ are selected from H or $CH_3$ and $R^1$ is tertiary butyl.

10. A polyester according to claim 9 containing both stabilizer (I) and stabilizer (II).

* * * * *